United States Patent
Mehta et al.

(10) Patent No.: US 10,494,284 B2
(45) Date of Patent: Dec. 3, 2019

(54) ON-DEMAND SYSTEM FOR DRAWING AND PURIFYING WELL WATER

(71) Applicant: THE COCA-COLA COMPANY, Atlanta, GA (US)

(72) Inventors: Anish Mehta, Alpharetta, GA (US); Mamunur Rahman, Smyrna, GA (US)

(73) Assignee: The Coca-Cola Company, Atlanta, GA (US)

( * ) Notice: Subject to any disclaimer, the term of this patent is extended or adjusted under 35 U.S.C. 154(b) by 241 days.

(21) Appl. No.: 15/536,927

(22) PCT Filed: Dec. 16, 2015

(86) PCT No.: PCT/US2015/066058
§ 371 (c)(1),
(2) Date: Jun. 16, 2017

(87) PCT Pub. No.: WO2016/100491
PCT Pub. Date: Jun. 23, 2016

(65) Prior Publication Data
US 2019/0092668 A1    Mar. 28, 2019

Related U.S. Application Data

(60) Provisional application No. 62/094,319, filed on Dec. 19, 2014.

(51) Int. Cl.
*C02F 9/00* (2006.01)
*B01D 61/02* (2006.01)
(Continued)

(52) U.S. Cl.
CPC ............ *C02F 9/005* (2013.01); *B01D 61/025* (2013.01); *B01D 61/08* (2013.01); *B01D 61/12* (2013.01);
(Continued)

(58) Field of Classification Search
None
See application file for complete search history.

(56) References Cited

U.S. PATENT DOCUMENTS

2002/0036162 A1* 3/2002 Magnusson ......... B01D 35/153
                                                                210/232
2003/0019764 A1   1/2003 Baldwin et al.
(Continued)

OTHER PUBLICATIONS

PCT International Search Report and Written Opinion for International Application No. PCT/US2015/066058 dated Apr. 8, 2016.

*Primary Examiner* — Richard C Gurtowski
(74) *Attorney, Agent, or Firm* — Eversheds Sutherland (US) LLP

(57) ABSTRACT

This disclosure provides systems and methods for generating potable water from contaminated water sources, particularly well water. By eliminating the purified water holding tank, employing a combination of source tank with carbon and reverse osmosis filters in series, and using an actuated pump to supply impure water from the source, a simple on-demand system is provided that is especially adapted for use in remote locations. The system and method are particularly useful where only direct current power, such as from a solar photovoltaic panel power, is available.

15 Claims, 2 Drawing Sheets

(51) Int. Cl.
    *B01D 61/08*     (2006.01)
    *B01D 61/12*     (2006.01)
    *C02F 1/00*     (2006.01)
    *C02F 1/28*     (2006.01)
    *C02F 1/44*     (2006.01)
    *C02F 1/76*     (2006.01)
    *C02F 1/50*     (2006.01)
    *C02F 101/12*     (2006.01)
    *C02F 101/20*     (2006.01)
    *C02F 101/30*     (2006.01)
    *C02F 101/32*     (2006.01)

(52) U.S. Cl.
    CPC .. *B01D 2311/04* (2013.01); *B01D 2311/2649* (2013.01); *C02F 1/001* (2013.01); *C02F 1/283* (2013.01); *C02F 1/441* (2013.01); *C02F 1/50* (2013.01); *C02F 1/76* (2013.01); *C02F 2101/12* (2013.01); *C02F 2101/20* (2013.01); *C02F 2101/306* (2013.01); *C02F 2101/322* (2013.01); *C02F 2201/005* (2013.01); *C02F 2201/009* (2013.01); *C02F 2209/04* (2013.01); *C02F 2209/29* (2013.01); *C02F 2209/42* (2013.01); *C02F 2303/04* (2013.01); *Y02A 20/211* (2018.01); *Y02A 20/212* (2018.01); *Y02W 10/37* (2015.05)

(56) References Cited

U.S. PATENT DOCUMENTS

| | | |
|---|---|---|
| 2004/0168989 A1 | 9/2004 | Tempest |
| 2005/0139530 A1* | 6/2005 | Heiss .................. C02F 9/00 210/85 |
| 2011/0186529 A1 | 8/2011 | Wright |
| 2012/0024796 A1 | 2/2012 | Fischmann |
| 2014/0021126 A1 | 1/2014 | Luo et al. |

* cited by examiner

ON-DEMAND SYSTEM FOR DRAWING AND PURIFYING WELL WATER

CROSS REFERENCE TO RELATED APPLICATIONS

This application claims the benefit of priority of U.S. Provisional Patent Application No. 62/094,319, filed Dec. 19, 2014, which is incorporated by reference in its entirety, and PCT Patent Application No. PCT/US2015/066058, filed Dec. 16, 2015, and published as WO/2016/100491 on Jun. 23, 2016, which is incorporated by reference in its entirety.

TECHNICAL FIELD

This disclosure relates to methods and systems for generating potable water from impure or contaminated water, such as crude well water (groundwater).

BACKGROUND

A ready supply of pure water is generally regarded as the single most important factor affecting human health. Millions of individuals become ill each year from drinking water that is contaminated with dangerously high levels of chemical and/or biological impurities. Pollutants often occur in well water (groundwater) as well as in surface water, particularly in developing countries. Moreover, developing countries often lack the resources to sufficiently and systematically treat water to remove organic compounds such as volatile organic compounds (VOCs), pesticides and their breakdown products, heavy metals, parasites, viruses, and bacteria that pose such risks. Infants and young children are at much greater risk than adults from drinking impure water.

This situation is particularly dire in developing nations, where sources of potable or human drinking water can be scarce and the water from those sources is often impure. Much of the water from wells contains suspended solid contaminants that also must be removed along with chemical and biological contaminants. The lack of sufficient and reliable power to operate a purification system also may present serious problems, even when a purification system is available. This problem is acute for hospitals and clinics in remote areas, but also adversely affects the daily lives of the people of these areas.

Therefore, there is a need for methods, systems, and purification units that can generate and dispense purified water, particularly in an on-demand fashion, that can be readily powered and used with well water, municipal water, or ground water. Desirable systems should be capable of operating from a variety of different electrical power sources, with a minimum of maintenance and for extended periods of time. Systems that can operate in harsh environments with little or no technical expertise required for their upkeep would be useful. For example, such systems should eliminate expensive, complex maintenance procedures such as cleaning, should avoid long wait times between activating the system to deliver pure water and the actual time water is provided, and should be safe and simple to use so that children can fill containers from the water so-supplied. Particularly desirable systems would not require a product tank that necessitated any additional post treatments for water storage.

SUMMARY OF THE DISCLOSURE

In one aspect, the disclosure provides an on-demand water treatment system and method that is designed to provide potable drinking water from various source (wells, municipal, and some ground sources), which do not require product storage tank for the system and which can be operated on direct current (DC) power (such as solar cells) for remote operation. Such a system and method can include, for example, automatic chlorinated disinfection with permeate or concentrate stream, and incorporates a pre-filtration stage for removing suspended solid contaminants. By eliminating the purified water holding tank and using an actuated pump to supply impure water from the source, a simple on-demand system is provided that is especially adapted for use in remote locations.

Among other things, the system can include a chlorination feature that provides protection against microorganisms inside the storage tank and prevents bio-film growth. Carbon block filters can be used to remove VOCs, cysts and the like, as well as any remaining free chlorine to prevent damage to a Reverse Osmosis (RO) system membrane that provides a final downstream purification or filtration stage to generate the potable drinking water. Among other things, this system does not require a product tank requiring any additional post treatments for water storage. A pressure regulated or flow controlled pump that can be operated on DC power (for example, 24 VDC) provides water for users on demand.

According to an aspect of this disclosure, there is provided a water filtration system for providing potable water on-demand, comprising the following elements in fluid communication:

a) a source of impure water, a source tank, and a first filtration stage between the source of impure water and the source tank;

b) a carbon filter block downstream of the source tank;

c) a reverse osmosis system downstream of the carbon filter block;

d) a permeate dispense valve downstream of the reverse osmosis system for providing potable water; and e) a pump in communication with an actuator, which supplies impure water from the source through the first filtration stage and into the storage tank, when a low pressure or low level condition drops below a predetermined value.

Thus, a method for providing potable water on-demand is also encompassed by this disclosure, the method comprising providing a water filtration system as disclosed above, and activating the permeate dispense valve to provide the potable water.

According to a further aspect of this disclosure, there is provided a water filtration system for providing potable water on-demand as described immediately above by elements a) through e), and comprising the disclosed elements a) through e) in fluid communication, the water filtration system further comprising:

f) an ORP meter downstream of the source tank to measure the chlorine concentration in the source tank discharge; and g) a chlorine doser valve in communication with the ORP meter that actuates a chlorine doser to add chlorine to the source tank, when the chlorine level drops below a first predetermined level.

Yet a further aspect of this disclosure provides a water filtration system for providing potable water on-demand as described immediately above by elements a) through g), and comprising the disclosed elements a) through g) in fluid communication, the water filtration system further comprising:

h) a feedback loop valve downstream of the ORP meter that actuates a water feedback loop to return water to the source tank, when the chlorine level rises above a second predetermined level.

According, a method for providing potable water on-demand is also encompassed by the disclosure of this system, the method comprising providing a water filtration system as disclosed immediately above with the additional features, actuating the chlorine doser valve of element g) to add chlorine to the source tank if the chlorine level drops below the first predetermined level. In some aspects and embodiments, the method can further comprise actuating the feedback loop valve of element h) to return water to the source tank if the chlorine level rises above the second predetermined level, and activating the permeate dispense valve to provide the potable water.

BRIEF DESCRIPTION OF THE FIGURES

Various aspects and embodiments of this disclosure are illustrated in the drawings provided herein.

DETAILED DESCRIPTION OF THE DISCLOSURE

Generally, disclosed herein is an on-demand water treatment system and method that provides potable drinking water from any ground water source, particularly wells, which does not require any product storage tank, and which can be operated on DC power for remote operation. The present system and method can include, for example, an automatic chlorinated disinfection feature and can incorporate a pre-filtration stage for removing suspended solid contaminants.

Figure 1:
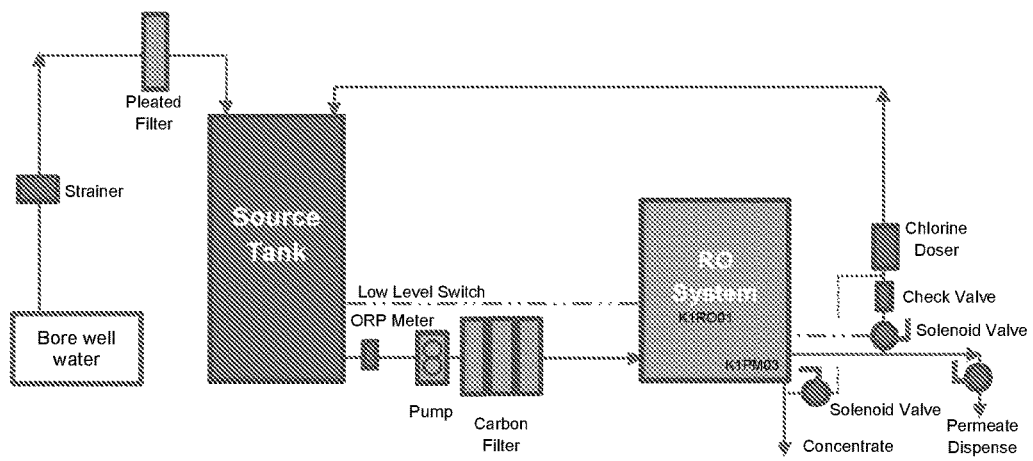
FIG. 1 provides an illustration of one aspect of the present disclosure, showing a schematic of a one embodiment of the system for illustration purposes.

One aspect of the present disclosure is provided at FIG. 1. The system illustrated in FIG. 1 draws water from bore wells with a well pump, coarsely strains, and then pre-filters the source water to remove suspended solids. Typically, a pleated cartridge filter can be used in this pre-filtration stage, and such cartridges can be readily replaced without requiring any special technical expertise. Moreover, the pleated cartridge filter can be tailored according to the specific chemical and biological contaminants in the well water. For example, high iron content water can be ameliorated using a specific prefilter for iron or other metal contaminants.

Pre-filtered water is then stored in a source tank as shown in FIG. 1. If desired, the source tank could also receive water from a pressurized water source or other water source. When purified water is desired, the stored water is passed from the source tank, through a source pump, through multiple carbon filters, and into a reverse osmosis water treatment system in sequence. Among other things, the carbon filter block pre-filters the water to remove VOCs, cysts, and chlorine from the source tank. The reverse osmosis (RO) system removes the remaining contaminants according to the membrane design capacity.

The filtration sequence ends with a water dispense faucet that facilitates the on-demand feature of the present system. When the faucet is opened and the discharge line pressure drops, a pressure switch is triggered which activates the source pump and provides potable drinking water to users. When the water dispense faucet is closed, the discharge line pressure increases to a pre-set condition, thereby triggering the pressure switch to shut off the source pump. This combination of features makes the disclosed water treatment system configuration a completely "on-demand" system. Because the system has sufficient on-demand water flow and pressure, this configuration allows the system to keep pace with user demand, and therefore a permeate storage tank is not required. According to another aspect of FIG. 1, a low water level indicator can be used to monitor the water level of the source tank, which can activate the well pump to force additional water into the source tank when the level drops below a predetermined level or volume.

The source tank can be chlorine disinfected with food grade chlorination tablets or other food grade chlorination product. As illustrated in FIG. 1, this chlorination feature can be accomplished with an inline chlorinator, that utilizes a partial stream from either the permeate or the concentrate flow. Also illustrated in the FIG. 1 embodiment is an ORP (oxidation-reduction potential) meter, that measures the chlorine level in the source tank discharge, and which turns on a solenoid valve on the permeate side stream to provide chlorination with the inline chlorinator. Alternatively, the same ORP meter feedback can turn on a solenoid valve on the concentrate side stream to provide chlorination through the inline chlorinator. In any embodiment, the present system is capable of direct current operation, including 24 VDC operation from solar photovoltaic panel power.

Figure 2:
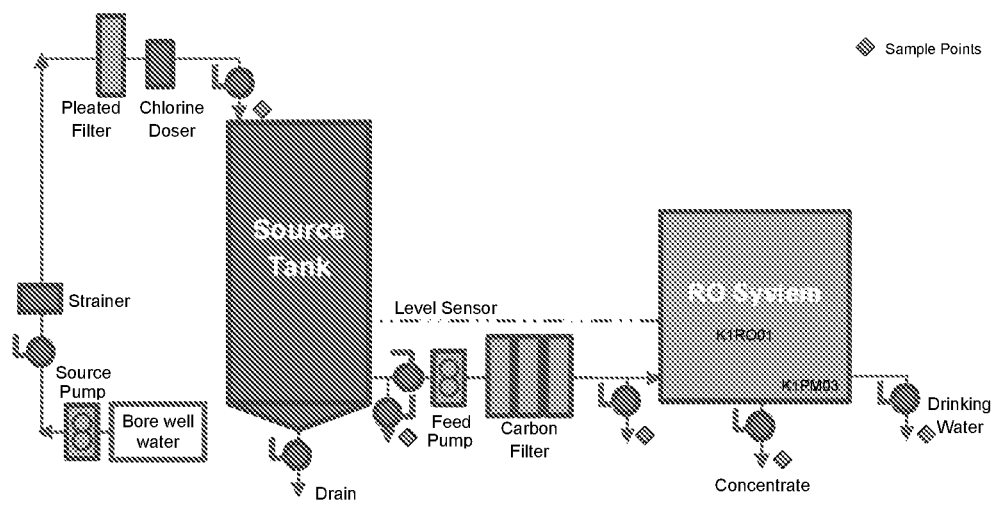
FIG. 2 also illustrates an aspect of the present disclosure, showing a schematic of an alternatively embodiment of the system for illustration purposes.

FIG. 2 illustrates a schematic of other aspects and embodiments of the system and method of the disclosure. Typically, the intake water for the disclosed treatment system can be drawn from multiple sources, such as uninfluenced wells, municipal water, and other sources. In various embodiments, water typically can be pumped from the source to a storage tank, such as a 1000 or 2000 L storage tank. Tank size can depend on, for example, the local water and power supply, as well as the local consumption needs. The source water can be piped to the tank with stainless steel piping or National Sanitation Foundation (NSF)-approved pipe and fittings.

The block diagram of FIG. 2 depicts one water system configuration, in which source water is pre-filtered with pleated cartridge filters and then run through an inline chlorinator (chlorine doser) before being stored in the source tank. Chlorination level can be adjusted based on source water conditions. The free chlorine level in the source tank is generally maintained between about 1 to about 2 ppm. Following chlorination, there may be mineral deposit at the conical bottom of the tank, and such deposits can be removed regularly, for example by simply draining or rinsing out. This regular procedure would prevent deposit build-ups that could harbor microorganisms that may be difficult to access and treat with chlorination.

In the FIG. 2 system, when a user opens the faucet to collect purified water, the stored water is pumped by a feed pump through the carbon block filters, and subsequently through the reverse osmosis (RO) membranes, and thereby dispensed on-demand. Generally, the carbon blocks remove free chlorine, volatile organics and other organic compounds, and harmful cysts. Following carbon filtration, the RO membranes remove the remainder of the contaminants and provide safe drinking water. Through this filtration process a concentrate stream is generated with the filtered contaminants, and this stream then can be disposed of according to any local regulations. Further, this concentrate stream could be used for other purposes if desired, for example, for sanitary needs.

In various and sometimes typical operations and embodiments, the disclosed water treatment system can be installed at sites that have a source of water that is available at all times of the day and all year round. The source water is typically a freshwater source from a sealed uninfluenced well or from a pre-treated municipal source. That is, the source water generally is not a surface source or an influenced well, and the source water is not brackish or salt water. Further, the source water is typically not influenced by runoffs, flooding, or other means of adulteration. The following Table illustrates typical minimum water quality requirements to work well with the disclosed

TABLE 1

Typical Minimum Source Water Quality

| Parameter | Value |
| --- | --- |
| Silt Density Index (SDI) | SDI < 3 |
| Total Dissolved Solids (TDS) | TDS < 2000 |
| Silica (ppm) | $SiO_2$ < 20 |
| Turbidity (NTU) | Turbidity < 1.0 |
| pH | pH = 3 to 10 |
| Iron & Manganese (ppm) | <0.01 |
| Chlorine/Chloramine - Maximum (mg/L) | <0.01* |
| Chloride (ppm) | <350 |

*Generally, the influent chlorine preferably does not exceed 0.01 mg/L to minimize damage to the reverse osmosis membrane filter.

In some aspects, incoming water supplies that do not meet these requirements may be advantageously subjected to additional pre-treatment prior to exposing, for example the carbon filters and the RO filtration unit to the water. System performance may be affected if requirements are far outside these typical specifications, including system output production and cartridge change-out frequency.

In some aspects, the disclosed system can be operated by trained operators who can operate the system daily and independently and could perform regular maintenance and quality monitoring requirements. Such operators can provide maintenance support, replacement of parts as needed, and monitor water quality typically with kits that are easy to use. If wireless coverage is available, wireless monitors that report water and filter quality can be used for remote data reporting. It is expected that such units can supply sufficient water for 300 or more users daily and be capable of, for example, 400 L (liter) per hour capacity. This is particularly achievable as the source tank is typically 1000 L to 2000 L in capacity. Usage above tank capacity would require regular water supply from the source.

In one aspect, the source of impure water can be a well or municipal water source, and can particularly be a sealed well. Thus, surface contamination of wells is typically controlled by the use of a surface seal. Providing a seal involves drilling a relatively large hole to a predetermined depth or to a confining formation (clay or bedrock, for example), and then further drilling a smaller hole for completing the well from that point forward. The well is typically cased from the surface down into the smaller hole, with a casing that is the same diameter as that hole. The annular space between the large bore hole and the smaller casing can be filled with, for example, bentonite clay, concrete, or other sealant materials. Such a procedure creates an impermeable seal from the surface to the next confining layer that keeps contaminants from migrating down the outer sidewalls of the casing or borehole and into the aquifer. Further, wells typically are capped with either an engineered well cap or seal that vents air through a screen into the well, but also keeps insects, small animals, and unauthorized persons from accessing the well.

There are a variety of aspects and embodiments of this disclosure that can be further described. For example, in a further aspect, the filtration system disclosed herein can constitute part of a water distribution center or kiosk, where the filtration system is particularly designed to meet requirements of low power consumption, high reliability, low maintenance, and versatile applicability for well waters and pre-treated municipal water. In this distribution center or kiosk arrangement, the treatment system can typically consists of a 1000 L source water storage tank that is filled from fresh water wells or from pre-treated municipal systems. An inline chlorination system to the source tank can provide microbiological disinfection. As disclosed herein, the water can be pushed through a carbon block filter to removes cysts, organics, pesticides, heavy metals and free chlorine from the source water tank. Downstream of the carbon block is the reverse osmosis unit in series, to clean and purify the water further. The RO unit completes the fine filtration process to eliminate remainder contaminants to dispense safe drinking water.

It is noted that typical RO membranes cannot withstand any chlorine concentration. Therefore, it is expected that the carbon filters will remove most of the chlorine, if not substantially all. The RO system includes a filtration membrane, so that any contaminants left in the water will be filtered through the membrane into a pipe separate from the safe drinking water, and will subsequently be recycled back to the source tank. In some embodiments, the water system can include a valve (not shown in the Figures) downstream of the carbon filter, for example, prior to any water entering the RO system, that is used to measure the amount of chlorine that goes into the tank. In some embodiments, the amount of chlorine will be measured daily using, for example, paper strip indicator. Alternatively, the chlorine entering the approach to measuring the chlorine going into the tank is by a DPD test kit that uses a colorimetric method.

The water distribution center or kiosk configuration is particularly useful for deploying the disclosed system in remote areas, where the lack of sufficient and reliable power to operate a purification system can present serious problems. In this case, the disclosed system can be operated very simply using two toggle switches to operate two pumps, namely a feed pump and a recirculation pump. Typically, a control panel can be powered up to operate the unit with a start push button, which is separate from the stop switch to power down the unit. Such a unit operates as a true on-demand dispense unit, because there is no delay in start-up and dispense, which is immediate after start up. Thus, when the user opens the dispense faucet the pumps turn on and dispenses safe drinking water. In such embodiments, the disclosed system can produce at least about 10,000 liters of water per day if run continuously. While the full unit can be operated and adapted for AC or DC power configurations, the disclosed unit has the advantage of operating highly efficiently with solar photovoltaic panel power, with well below 1 kW power needed when in operation. In standby the disclosed unit can use very small amounts of power. Further, the system can incorporate simple controls for basic unit functionality and can measure inlet and dispense water conductivity for monitoring quality.

Additional features that can be provided by the disclosed system are simple regular maintenance service plans, which typically use an operator to clean pre-filters on an as-needed basis. This pre-filter cleaning is estimated to be about monthly in frequency. In embodiments that do not use automatic chlorine dosing, maintenance can include the operator checking source tank free chlorine level daily and adding chlorination for disinfection as required. As part of planned maintenance it is estimated the pre-filters are expected to be replaced approximately once every three to six months, the RO membranes approximately once a year, and the pumps approximately once every three years or more.

Once the disclosed system is installed, startup follows good engineering practice. For example, on initial filling of the source tank with unpurified water, the system is chlorinated for a minimum of 3 hours to allow the antimicrobial action to take effect. Free chlorine level is checked in the source tank, and the process of adding more chlorination and/or waiting for the full contact time can be used. If chlorine levels are too high, for example, over 4ppm, then additional raw (unpurified) can be added to the source tank and the maintained for an additional contact time. Water samples can be taken and measured as required. Typically, the RO membranes can be run for 8 or more hours during startup. It may be desirable to run more than one quantity of water equivalent to one source tank through the system during startup. That is, it may be useful to empty the source tank once, then refill and disinfect it, and then use the second batch to run through the system a second time. Such a procedure will aid in, for example, flushing out the sodium bisulfite storage solution of the RO membranes. Additional tanks of water may be run through the system at starup if desired, to remove additional contaminants associated with the startup procedure.

Definitions

To define more clearly the terms used herein, the following definitions are provided, which are applicable to this disclosure unless otherwise indicated by the disclosure or the context. To the extent that any definition or usage provided by any document incorporated herein by reference conflicts with the definition or usage provided herein, the definition or usage provided herein controls.

The terms "chlorine" and "chlorination" and the like refer to the use of conventional chlorine-containing antimicrobial, antibacterial, and disinfectant products such as hypochlorite-containing compounds and components, that are suitable for use in a water purification system that produces water for consumption.

The term "volatile organic compound" (VOC) is used according to its usual and ordinary meaning to refer to organic chemicals that have high vapor pressures at ordinary room temperatures, and combinations of such chemicals.

The term "sanitary well seal" is used to refer to a manufactured seal installed at the top of the well casing which, when installed, creates a watertight seal to prevent contaminated or polluted water from gaining access to the ground water supply.

Throughout this specification, various publications may be referenced. The disclosures of these publications are hereby incorporated by reference in pertinent part, in order to more fully describe the state of the art to which the disclosed subject matter pertains. The references disclosed are also individually and specifically incorporated by reference herein for the material contained in them that is discussed in the sentence in which the reference is relied upon. To the extent that any definition or usage provided by any document incorporated herein by reference conflicts with the definition or usage applied herein, the definition or usage applied herein controls.

As used in the specification and the appended claims, the singular forms "a," "an," and "the" include plural referents, unless the context clearly dictates otherwise. Thus, for example, reference to "a projectile" includes a single projectile such as a slug, as well as any combination of more than one projectile, such as multiple pellets of shot of any size or combination of sizes. Also for example, reference to "a projectile" includes multiple particles of a chemical composition or mixture of compositions that constitutes a projectile, and the like.

Throughout the specification and claims, the word "comprise" and variations of the word, such as "comprising" and "comprises," means "including but not limited to," and is not intended to exclude, for example, other additives, components, elements, or steps. While compositions and methods are described in terms of "comprising" various components or steps, the compositions and methods can also "consist essentially of" or "consist of" the various components or steps.

"Optional" or "optionally" means that the subsequently described element, component, step, or circumstance can or cannot occur, and that the description includes instances where the element, component, step, or circumstance occurs and instances where it does not.

Unless indicated otherwise, when a range of any type is disclosed or claimed, for example a range of the particle sizes, percentages, temperatures, and the like, it is intended to disclose or claim individually each possible number that such a range could reasonably encompass, including any sub-ranges or combinations of sub-ranges encompassed therein. When describing a range of measurements such as sizes or weight percentages, every possible number that such a range could reasonably encompass can, for example, refer to values within the range with one significant figure more than is present in the end points of a range, or refer to values within the range with the same number of significant figures as the end point with the most significant figures, as the context indicates or permits. For example, when describing a range of percentages such as from 85% to 95%, it is understood that this disclosure is intended to encompass each of 85%, 86%, 87%, 88%, 89%, 90%, 91%, 92%, 93%, 94%, and 95%, as well as any ranges, sub-ranges, and combinations of sub-ranges encompassed therein. Applicants' intent is that these two methods of describing the range are interchangeable. Accordingly, Applicants reserve the right to proviso out or exclude any individual members of any such group, including any sub-ranges or combinations of sub-ranges within the group, if for any reason Applicants choose to claim less than the full measure of the disclosure, for example, to account for a reference that Applicants are unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, or ±3% of the stated value.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that are employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

Those skilled in the art will readily appreciate that many modifications are possible in the exemplary embodiments disclosed herein without materially departing from the novel teachings and advantages according to this disclosure. Accordingly, all such modifications and equivalents are intended to be included within the scope of this disclosure as defined in the following claims. Therefore, it is to be understood that resort can be had to various other aspects, embodiments, modifications, and equivalents thereof which, after reading the description herein, may suggest themselves to one of ordinary skill in the art without departing from the spirit of the present disclosure or the scope of the appended claims.

What is claimed is:

1. A water filtration system for providing potable water on-demand, comprising, in fluid communication:
   a) a source of impure water, a source tank, and a first filtration stage between the source of impure water and the source tank;
   b) a carbon filter block downstream of the source tank;
   c) a reverse osmosis system downstream of the carbon filter block;
   d) a permeate dispense valve downstream of the reverse osmosis system for providing potable water; and
   e) a pump in communication with an actuator, which supplies impure water from the source through the first filtration stage and into the source tank, when a water pressure drops below a predetermined pressure value or when a water level drops below a predetermined water level value
   f) an ORP meter downstream of the source tank to measure a chlorine level in the source tank discharge;
   g) a chlorine doser valve in communication with the ORP meter that actuates a chlorine doser to add chlorine to the source tank, when the chlorine level drops below a first predetermined chlorine level; and
   h) a feedback loop valve downstream of the ORP meter that actuates a water feedback loop to return water to the source tank, when the chlorine level rises above a second predetermined chlorine level.

2. A water filtration system according to claim 1, wherein the actuator is a pressure switch in fluid communication with the system, the pressure switch activating the pump when the water pressure drops below a predetermined pressure value.

3. A water filtration system according to claim 1, wherein the actuator is a water level indicator in communication with the source tank, the water level indicator activating the pump when the water level in the source tank drops below a predetermined water level value.

4. A water filtration system according to claim 1, wherein the first predetermined chlorine level is about 1 ppm chlorine concentration.

5. A water filtration system according to claim 1, wherein the second predetermined chlorine level is about 2 ppm chlorine concentration.

6. A water filtration system according to claim 1, wherein the pump is operated on DC power.

7. A water filtration system according to claim 1, e pump is operated by 24 VDC power from a solar photovoltaic panel.

8. A water filtration system according to claim 1, wherein the first filtration stage comprises a pleated cartridge filter.

9. A water filtration system according to claim 1, wherein the first filtration stage is selected to reduce metal content.

10. A water filtration system according to claim 1, further comprising a coarse strainer upstream of the first filtration stage, to remove particulates.

11. A water filtration system according to claim 1, wherein the source tank is a 1000 L to 2000 L storage tank.

12. A water filtration system according to claim 1, wherein the source of impure water is provided to the source tank by National Sanitation Foundation (NSF)-approved pipe and fittings.

13. A water filtration system according to claim 1, wherein the source of impure water is a well or a municipal water source.

14. A method for providing potable water on-demand, comprising,
    a) providing a water filtration system according to claim 1, and
    b) activating the permeate dispense valve to provide the potable water.

15. A method for providing potable water on-demand, comprising,
    a) providing a water filtration system according to claim 1,
    b) actuating the chlorine doser valve to add chlorine to the source tank if the chlorine level drops below the first predetermined level; and
    c) activating the permeate dispense valve to provide the potable water.

* * * * *